United States Patent [19]

Brunelle et al.

[11] Patent Number: 5,407,984
[45] Date of Patent: Apr. 18, 1995

[54] PROCESS FOR PREPARING MACROCYCLIC POLYESTER OLIGOMERS

[75] Inventors: Daniel J. Brunelle, Glenville; Tohru Takekoshi, Scotia, both of N.Y.

[73] Assignee: General Electric Company, Schenectady, N.Y.

[21] Appl. No.: 298,706

[22] Filed: Aug. 31, 1994

[51] Int. Cl.$^6$ ................................................. C08K 5/57
[52] U.S. Cl. .................................... 524/178; 524/390; 525/437; 528/481; 528/491; 528/497; 528/503
[58] Field of Search ................ 525/437; 528/481, 491, 528/497, 503; 524/178, 390

[56] References Cited

U.S. PATENT DOCUMENTS

| | | | |
|---|---|---|---|
| 3,969,319 | 7/1976 | Hutton et al. | 524/178 |
| 4,014,858 | 3/1977 | Chipman et al. | 528/283 |
| 4,132,707 | 1/1979 | Borman | 528/273 |
| 4,403,090 | 9/1983 | Smith | 528/272 |
| 4,611,049 | 9/1986 | Kuratsuji et al. | 528/279 |
| 4,656,241 | 4/1987 | Iida et al. | 528/279 |
| 4,710,547 | 12/1987 | Uryu et al. | 525/437 |
| 4,803,235 | 2/1989 | Okada | 524/494 |
| 4,983,713 | 1/1991 | Hayashi et al. | 528/190 |
| 5,039,783 | 8/1991 | Brunelle et al. | 528/272 |
| 5,049,643 | 9/1991 | Kageyama et al. | 528/194 |
| 5,179,192 | 1/1993 | Kanaka et al. | 528/272 |
| 5,183,878 | 2/1993 | Kanaka et al. | 528/193 |

FOREIGN PATENT DOCUMENTS 21873 6/1971 Japan.

*Primary Examiner*—Samuel A. Acquah
*Attorney, Agent, or Firm*—Edward E. Squillante, Jr.; William H. Pittman

[57] ABSTRACT

A process for producing macrocyclic polyester oligomers from polyester linears is described and the process comprises the steps of combining polyester linears and organic solvents having tin catalysts present therein.

21 Claims, No Drawings

PROCESS FOR PREPARING MACROCYCLIC POLYESTER OLIGOMERS

FIELD OF THE INVENTION

This invention relates to a novel process for producing macrocyclic polyester oligomers. More particularly, the invention is directed to a process for producing said macrocyclic polyester oligomers by subjecting polyester linears to organic solvents having organotin catalysts present therein.

BACKGROUND OF THE INVENTION

Linear polyesters such as poly(alkylene terephthalates) are well known commercially available polymers. They have many valuable characteristics including strength, toughness, high gloss and solvent resistance. Linear polyesters are conventionally prepared by the reaction of a diol with a functional derivative of a dicarboxylic acid, typically a diacid halide or ester. Further, the above-described polyesters may be fabricated into articles by a number of well known techniques including injection and roto molding and extrusion.

In recent years, macrocyclic polyester oligomers have been developed and desired since they have unique properties which make them attractive as matrices for polymer composites. Such desired properties stem from the fact that macrocyclic polyester oligomers exhibit low viscosities, allowing them to impregnate a dense fibrous preform easily. Furthermore, such macrocyclic polyester oligomers melt and polymerize at temperatures well below the melting point of the resulting polymer. Thus, melt flow, polymerization and crystallization can occur isothermally and, therefore, the time and expense required to thermally cycle a tool is favorably reduced.

Previously known methods for producing macrocyclic polyester oligomers typically employ amine catalysts and corrosive acid halides such as terephthaloyl chloride. Such methods are often undesirable since they require environmentally unfriendly halides and expensive recycling steps associated with the formation of byproduct amine salts.

The instant invention, therefore, is directed to a novel process for producing macrocyclic polyester oligomers, wherein the method comprises the step of subjecting polyester linears to organic solvents having organotin catalysts present therein.

DESCRIPTION OF THE PRIOR ART

Processes for preparing polyesters have been disclosed in the art. In commonly assigned U.S. Pat. No. 5,039,783, macrocyclic polyester oligomers are prepared via the condensation of diols with diacid chlorides in the presence of non-sterically hindered amine catalysts.

Additionally, in commonly assigned U.S. Pat. No. 4,132,707, a method for converting linear polyesters to branched copolyesters is described. In said method, poly(alkylene terephthalate) is combined with a mixture of phenol and tetrachloroethane and a branching component in order to produce a solid particulate blend. The solid particulate blend is subsequently heated in the presence of an inert gas in order to produce the desired branched copolyester.

Still other investigators have focused on the production of polyesters. In commonly assigned U.S. patent application Ser. No. 08/181,944, a method for producing thermoplastic polyester foams is described and the method comprises the step of subjecting macrocyclic ester oligomer precursors to initiators and blowing agents.

Finally, in commonly assigned U.S. patent application No. 07/702,577, a method is disclosed for producing linear polyesters from macrocyclic polyester oligomers with a tin containing catalyst.

The instantly claimed invention is patentably distinguishable from the above-described since, among other reasons, it is directed to a novel process for producing macrocyclic polyester oligomers by subjecting polyester linears to organic solvents having organotin catalysts present therein.

SUMMARY OF THE INVENTION

The instant invention is directed to a novel process for producing macrocyclic polyester oligomers. The novel process comprises the step of heating a mixture of:

(a) polyester linears;
(b) organic solvents; and
(c) tin catalysts.

Moreover, the instant invention unexpectedly results in the conversion of polyester linears to macrocyclic polyester oligomers in at least about 50% yield and preferably at least about 75% yield and most preferably at least about 90% yield, and it does not require the use of amines and corrosive acid halides including terephthaloyl chloride.

DETAILED DESCRIPTION OF THE PREFERRED EMBODIMENTS

In the instant invention, polyester linears are defined as oligomers and polymers and they have the formula

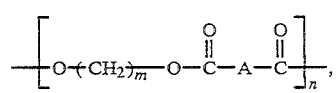

wherein m is 2 to 10 and preferably 2 to 4 and n is 20 to 500 and preferably 50 to 300 and most preferably 100 to 200 and A is a mono- or polycyclic divalent aromatic radical and preferably a 1,3- or 1,4-divalent aromatic radical and most preferably a 1,4-divalent aromatic radical when A is monocyclic. Additionally, when A is a polycyclic divalent aromatic radical, it is preferably a 1,4-, 1,5- or 2,6-naphthylenic radical. Moreover, said polyester linears may have branched side chains.

The polyester linears employed in the instant invention and described above are poly(alkylene dicarboxylates) and typically of the family consisting of polymeric glycol terephthalates or isophthalates and mixtures thereof including copolyesters of terephthalic and isophthalic acids. Especially preferred polyester linears employed in the instant invention are poly(1,2-ethylene terephthalate) (PET) and poly(1,4-butylene terephthalate) (PBT) and copolyesters comprising the same. Said copolyesters typically comprise less than about 25% by weight PET but preferably less than about 15% by weight PET. Other preferred polyester linears include poly(1,2-ethylene 2,6-naphthalenedicarboxylate) (PEN) and the like.

The polyester linears employed in this invention are commercially available and often prepared by the alcoholysis of esters of phthalic acid with a glycol and subsequent polymerization which is achieved by heating the resulting mixture in the presence of an ester interchange catalyst. Other descriptions for the preparation of the above-mentioned polyester linears may be found in commonly assigned U.S. Pat. No. 4,126,592, the disclosure of which is incorporated herein by reference.

The organic solvents that may be employed in the instant invention are well known and commercially available and they include those having a boiling point of at least about 110° C. Illustrative examples of the organic solvents that may be employed in the instant invention include xylene, chlorobenzene, naphthalene, toluene, tetramethylbenzene, methylnaphthalene, o-dichlorobenzene and mixtures thereof.

There is no limitation with respect to the tin catalysts which may be employed in the instant invention other than that they are organotin compounds having at least one tin atom bonded to two carbon atoms and one or two oxygen atoms.

The above-mentioned tin catalysts employed in the instant invention include organotin compounds such as dialkyltin catalysts including dialkyltin oxides and dialkyltin alkoxides.

The dialkyltin oxides have the formula $$(R)_2-Sn=O, \qquad \text{IIa}$$

and the dialkyltin alkoxide catalysts have the formula $$(R)_2-Sn-(O-R^1)_2, \qquad \text{IIb}$$

wherein each R is independently a $C_{1-10}$ alkyl group and preferably butyl groups or octyl groups. Each $R^1$ is independently a $C_{1-10}$ branched or unbranched hydrocarbon or together, each of the two $R^1$ groups form divalent aliphatic unsubstituted or substituted hydrocarbon radicals wherein the hydrocarbon radicals can include olefinic radicals and the substituted radicals can include fused rings.

TABLE I

Dialkyltin Catalysts

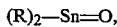
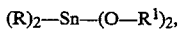

TABLE I-continued

Dialkyltin Catalysts

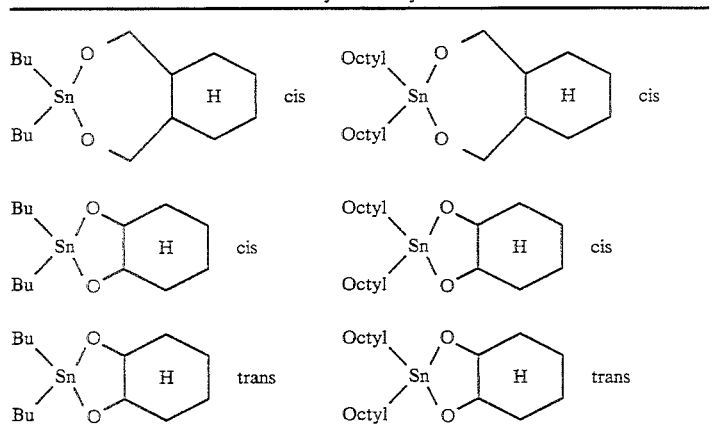

Additional organotin compounds which may be employed as catalysts in the instant invention include stannoxanes such as those having the formula

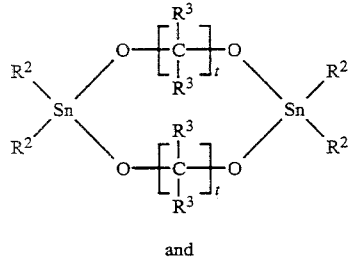

and

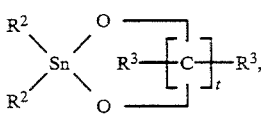

wherein each $R^2$ is independently a $C_{1-10}$ alkyl group and each $R^3$ is independently a $C_{1-4}$ alkyl group or hydrogen and t is a number from 1 to 5 and preferably 3.

Still other organotin compounds which may be used as tin catalysts in the instant invention include spiro tin compounds having the formula

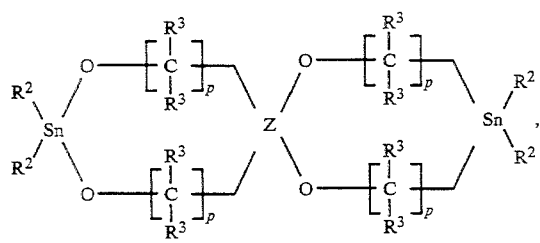

wherein each $R^2$ and $R^3$ are as previously defined and each p is independently 0 to 3 and Z is a tetravalent aliphatic hydrocarbon, a tetravalent carbon atom or

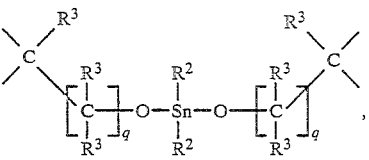

wherein each $R^2$ and $R^3$ are as previously defined and each q is independently 1 to 4. It is often preferred that the compound represented by formula V is 3,3,9,9-tetrabutyl-2,4,8,10-tetraoxa-3,9-distannaspiro[5.5]-undecane.

The dialkyltin alkoxides catalysts employed in this invention are the reaction product of, for instance, (alkyl)$_2$SnO and monofunctional and polyfunctional alcohols including diols, triols and tetraols. A non-limiting illustrative list of dialkyltin catalysts is provided for hereinbelow in Table I.

The stannoxanes described above may be prepared by reacting dialkyltin oxides with alkylene glycols under reflux conditions. A detailed description of the preparation of the stannaoxacycloalkanes employed in this invention may be found in J. Bornstein et al., J. Org. Chem., 24 (1959) 886 the disclosure of which is incorporated hereby by reference.

The spiro tin compounds utilized in the instant invention can be prepared by, for instance, the cyclic condensation of one equivalent of tetrafunctional alcohol pentaerythritol with two equivalents of dialkyltin oxide in an anhydrous organic solvent under reflux. A detailed description of such preparation may be found in ACS Polymer Preprints, 33(1), 1111-1112, 1992 and U.S. Pat. No. 3,969,319, the disclosures of which are incorporated herein by reference.

Additional methods for preparing the spiro tin compounds that may be employed in this invention are described in U.S. patent application Ser. No. 08/262,793, the disclosure of which is incorporated herein by reference.

The novel process for producing macrocyclic polyester oligomers as described in this invention surprisingly does not require extremely dilute conditions in order to produce respectable yields of the desired products. There are no limitations with respect to the amount of solvent employed other than said amount results in the dissolution of polyester linears. Often, however, the concentration of the resulting solution is less than about 0.30M and preferably less than about 0.20M and most preferably less than about 0.10M, based on the structural unit of the polymer.

The reaction temperatures (presence of heat) that may be chosen in the instant invention are also not limited. Typically, any temperature that results in the dissolution of polyester linears in the solvent may be employed. Often, however, the temperatures chosen are from about 140° C. to about 240° C. but preferably from about 180° C. to about 230° C and most preferably from about 190° C. to about 215° C.

The amount of catalyst employed in the instant invention is usually from about 1.0 to about 5.0 mole percent tin for every polyester monomer unit and preferably from about 2.0 to about 3.0 mole percent tin for every polyester monomer unit.

When conducting the instant invention, the polyester linears are added to the solvent. Stirring may be employed to induce solution formation and pressure may be varied to optimize reaction conditions. The catalyst can be added as a solid to the mixture although solutions consisting of solvent and catalyst can also be used. Heat may be supplied prior to, during or after the additions. Equilibrium is typically observed in the resulting product solution within 2 hours and often from about 30 minutes to about 2 hours. The desired and resulting macrocyclic polyester oligomers can be separated from the product solution by cooling said product solution to between about 50° to about 100° C. and preferably between about 60° to about 80° C. to induce precipitation of the linear polyester followed by filtering. The macrocyclic polyester oligomers are recovered by evaporation of the resulting titrate to remove any remaining solvent. The recovered macrocyclic polyester oligomers are substantially pure and often at least about 50 percent pure and preferably at least about 75 percent pure and most preferably at least about 95 percent pure. Moreover, the macrocyclic polyester oligomers produced contain less than about 2.0 percent polyester linears and preferably less than about 1.0 percent polyester linears and most preferably less than about 0.5 percent polyester linears.

The following example illustrates and facilitates the production of macrocyclic polyester oligomers via the process steps of the instant invention. The product obtained may be confirmed, for instance, by high performance liquid chromatography (HPLC) or mass spectroscopy and molecular weight and cyclic to polymer ratio was confirmed by gel permeation chromotography.

EXAMPLE 1

A 50 ml round-bottom flask was charged with 880 mg of poly(1,4-butylene terephthalate) ($M_w$=105,000 based on polystyrene) and 40 ml of o-dichlorobenzene to produce a (0.1M) solution. The solution was heated to 190° C. and 35 mg of a stannoxanes catalyst (3.0 mole percent tin for every polyester unit) was added (as depicted by formula III, t=2, $R^2$=butyl, $R^3$=H) to produce a product solution. Equilibrium was reached after 1 hour. The product solution was cooled to about 75° C. to induce precipitation of the linear polymer which was removed by filteration. The cyclic oligomer was subsequently recovered from the resulting filtrate by vacuum evaporation. The desired macrocyclic butylene terephthalate oligomer was recovered (55% yield based on initial amount of polyester linear) and the oligomer was greater than 95% pure with less than 0.5% linears.

EXAMPLE 2

Example 2 was prepared in a manner similar to Example 1 except that a 0.05M solution was employed and the yield of macrocyclic butylene terephthalate oligomer was 90% based on initial amount of polyester linear.

The data in the Table which follows has been compiled to demonstrate the unexpected superior results obtained via the process steps of the instant invention. All entries have been prepared in the manner similar to those described in the Examples.

TABLE

| Entry* | Solvent Concentration | Catalyst | Percent Macrocyclic Oligomer |
|---|---|---|---|
| 1 | 0.05 | organotin | 96 |
| 2 | 0.075 | organotin | 90 |
| 3 | 0.10 | organotin | 82 |
| 4 | 0.15 | organotin | 75 |
| 5 | 0.20 | organotin | 66 |
| 6 | 0.30 | organotin | 42 |
| 7 | 0.10 | organotin | 62 |
| 8 | 0.075 | organotin | 50 |

*Entries 7 and 8 were prepared with the polyester linear poly(1,4-butylene terephthalate) ($M_w$ = 85,000) and o-xylene in lieu of o-dichlorobenzene. Additionally, the percent macrocyclic oligomer is based on isolated yields.

What is claimed is:

1. A process for producing macrocyclic polyester oligomers comprising the steps of heating a mixture of:
   (a) polyester linears;
   (b) organic solvents; and
   (c) tin catalysts.

2. A process for producing macrocyclic polyester oligomers in accordance with claim 1 wherein said polyester linears are polymers or oligomers.

3. A process for producing macrocyclic polyester oligomers in accordance with claim 2 wherein said polyester linears have structural units of the formula

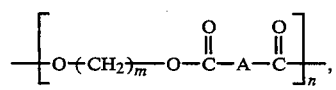

wherein m is 2 to 10, n is 20 to 500 and A is a mono- or polycyclic divalent aromatic radical.

4. A process for producing macrocyclic polyester oligomers in accordance with claim 3 wherein m is 2 to 4 and n is 50 to 300.

5. A process for producing macrocyclic polyester oligomers in accordance with claim 3 wherein A is a monocyclic divalent aromatic radical.

6. A process for producing macrocyclic polyester oligomers in accordance with claim 5 wherein said monocyclic divalent aromatic radical is a 1,3- or 1,4-divalent aromatic radical.

7. A process for producing macrocyclic polyester oligomers in accordance with claim 3 wherein A is a polycyclic divalent aromatic radical.

8. A process for producing macrocyclic polyester oligomers in accordance with claim 7 wherein said polycyclic divalent aromatic radical is a 1,4-, 1,5- or 2,6-naphthalenic radical.

9. A process for producing macrocyclic polyester oligomers in accordance with claim 1 wherein said polyester linears are poly(1,2-ethylene terephthalate), poly(1,4-butylene terephthalate) or copolyesters thereof.

10. A process for producing macrocyclic esters in accordance with claim 1 wherein said polyester linear is poly(1,2-ethylene 2,6-naphthalenedicarboxylate).

11. A process for producing macrocyclic esters in accordance with claim 1 wherein said tin catalyst is a dialkyl tin oxide or a dialkyl tin alkoxide wherein said dialkyl tin oxide has the formula

and the dialkyltin alkoxide has the formula

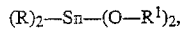

wherein each R is independently a $C_{1-10}$ alkyl group and each $R^1$ is independently a $C_{1-10}$ branched or unbranched hydrocarbon or together, each of the two $R^1$ groups form divalent aliphatic unsubstituted or substituted hydrocarbon radicals.

12. A process for producing macrocyclic polyester oligomers in accordance with claim 1 wherein said tin catalyst has the formula

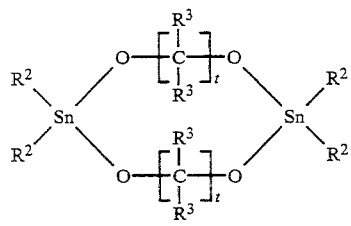

or

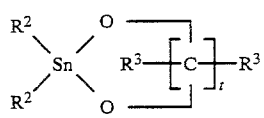

wherein each $R^2$ is independently a $C_{1-10}$ alkyl group and each $R^3$ is independently a $C_{1-4}$ alkyl group or hydrogen and t is a number from 1 to 5.

13. A process in accordance with claim 12 wherein said tin catalyst has the formula

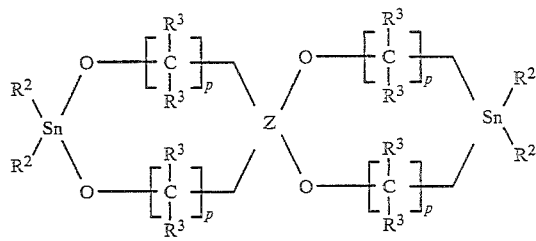

wherein each $R^2$ is independently a $C_{1-10}$ alkyl group and each $R^3$ is independently a $C_{1-4}$ alkyl group or hydrogen and each p is independently 0 to 3 and Z is a tetravalent aliphatic hydrocarbon, a tetravalent carbon atom or

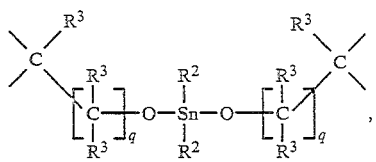

wherein each $R^2$ and $R^3$ are as previously defined and each q is independently 1 to 4.

14. A process for producing macrocyclic polyester oligomers in accordance with claim 13 wherein said tin catalyst is 3,3,9,9-tetrabutyl-2,4,8,10-tetraoxa-3,9-distannaspiro[5.5]-undecane.

15. A process for producing macrocyclic polyester oligomers in accordance with claim 1 wherein said organic solvents have a boiling point of at least about 110° C.

16. A process for producing macrocyclic polyester oligomers in accordance with claim 15 wherein said solvents are xylene, chlorobenzene, naphthalene, toluene, tetramethylbenzene, methylnaphthalene, o-dichlorobenzene or mixtures thereof.

17. A process for producing macrocyclic polyester oligomers in accordance with claim 1 wherein said heating is from about 140° C. to about 240° C.

18. A process for producing macrocyclic polyester oligomers in accordance with claim 1 wherein said polyester linears and organic solvents result in a solution having a concentration of less than about 0.30M, based on structural units of polymer.

19. A process for producing macrocyclic polyester oligomers in accordance with claim 1 wherein said tin catalyst is employed in an amount from about 1.0 to about 5.0 mole percent tin for every polyester monomer unit.

20. A process for producing macrocyclic polyester oligomers in accordance with claim 1 wherein said mixture becomes a product solution which is cooled to a temperature between about 50° C. to about 100° C. to precipitate polyester linears and produce a solution having said macrocyclic polyester oligomers dissolved therein.

21. A process for producing macrocyclic polyester oligomers in accordance with claim 20 wherein said macrocyclic polyester oligomers are recovered from said solution by evaporating the solvents.

* * * * *